Nov. 29, 1966    H. J. GOERNERT ET AL    3,287,998
FLUID PRESSURE DRILL GUIDE
Filed July 20, 1964

INVENTORS
HANS J. GOERNERT
CONRAD L. GOERNERT

BY *Charles R. Fay*
ATTORNEY

3,287,998
FLUID PRESSURE DRILL GUIDE
Hans J. Goernert and Conrad L. Goernert, both of Box 452, North Grosvenordale, Conn.
Filed July 20, 1964, Ser. No. 383,781
7 Claims. (Cl. 77—55)

This invention is an improvement in guides for cutting tools, and especially boring tools. In the present case the improvement consists in providing an improved construction for preventing vibration of the tool and for lubricating, etc., and in the use of a novel plastic insert adapter ring or sleeve is provided with a wall of predetermined thickness and an internal fluid pressure means expanding the ring, maintaining it in an improved guiding arrangement with respect to the usual drill bushing and walls of the hole being formed, this fluid pressure being derived from a source similar to the oil hole for instance in the usual boring bar or the like, and receiving a fluid such as oil, water, or even air under pressure as chemicals for chilling, to expand the plastic adapter sleeve into extremely close contact to interior surfaces. This steadies the drill and prevents vibration, lubricates, and provides lower oil filtration. It also prevents whip of long gun drills or boring units but at the same time uses the guide bushing. The tool can of course be used for boring, reaming on drill presses, automatics, lathes of all kinds, etc.

Other objects and advantages of the invention will appear hereinafter.

Figure 1:
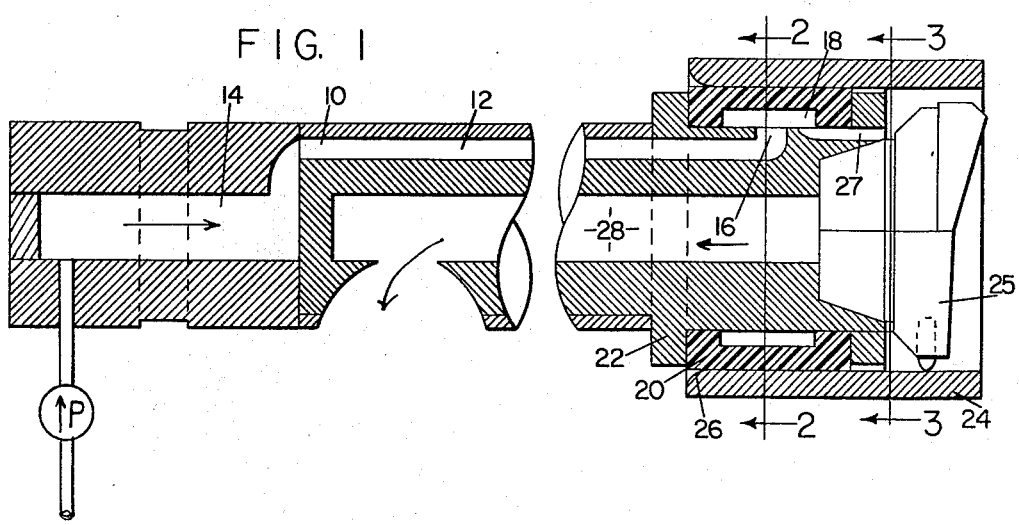
Figure 2:
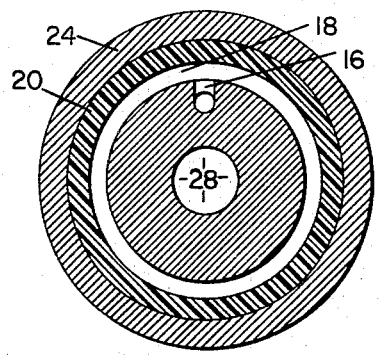
Figure 3:
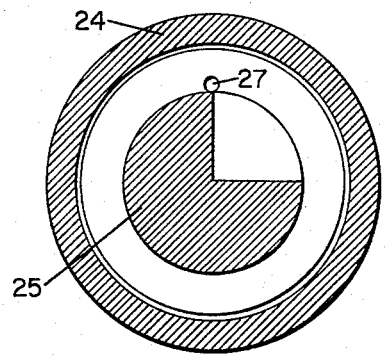

Reference is to be had to the accompanying drawings in which:

FIG. 1 is a view in section illustrating the invention;
FIG. 2 is a section on line 2—2 of FIG. 1, and
FIG. 3 is a section on line 3—3 of FIG. 1.

The invention has been illustrated as applied to a boring bar or gun drill but it can also be applied to any kind of twist drill, boring tool, blade for boring, reaming, etc.

As seen in FIG. 1 there is shown a tool having a shank generally indicated at 10. This is adapted to be held in any kind of usual holder not shown. It is provided with a longitudinal passage 12 extending into the part 14, 14 representing an oil hole receiving fluid under pressure from a pressure source P, as is well known to those skilled in the art.

The passage 12 extends to the right terminating in a radial orifice indicated at 16 at the side of the shank 10. This opening allows the fluid under pressure to enter into an annular passage 18 which is provided in the plastic insert adapter sleeve indicated at 20. This adapter sleeve is cylindrical and closely engages the periphery of the tube, with e.g. a clearance of .003 of an inch. By means of the tool adapter part 22 it can be thrust into the bushing 24. This bushing has an entrance flare or bevel 26 so as to allow the reception of the sleeve 20 which has a diameter slightly less than the inside diameter of the bushing 24. This sleeve will expand under pressure, and this action continues into the hole formed. The passage 18 is formed as a recess having a predetermined thickness of wall to expand under pressure.

It will be seen that the pressure in the passage 12 will be exerted outwardly against the relatively flexible material of the plastic adapter or sleeve 20 and thus will cause it to fit extremely snugly into the bushing, thus increasing the vibration dampening effect of the plastic sleeve which may be made of Delrin, Teflon, or the like.

The cutter is generally shown at 25 and is preferably like that shown in our copending application above identified, but in any event there is a passage 27 which is smaller than passage 12 to keep pressure constant at 18. Passage 27 extends longitudinally in the tool 10 so as to form a communication between the recess 18 in the sleeve 20 and the tool itself so as to lubricate the area of operation of the tool at 25; and this then is provided with the escape passage 28 so that the air, oil, water or other fluid not only increases the vibration dampening effect of the plastic member 20 but also lubricates and flushes.

The actual form of the insert ring or sleeve 20 can be of any kind desired to suit the circumstances and can be made in one or more parts as desired and is easily molded. As shown it is merely cylindrical and hollow and has the annular recess 18 as described. Its outside diameter is slightly less than that of the tool 24 and of the interior of the bushing 20.

Having thus described our invention and the advantages thereof, we do not wish to be limited to the details herein disclosed, otherwise than as set forth in the claims, but what we claim is:

1. The combination of a cutting tool which has a shank and a cutter head on the shank, of a guide comprising a plastic insert surrounding the cutter head and having in general a diameter slightly less than that of the cutter head, the plastic being of a semi-flexible nature, and means providing pressure exerted upon the interior surface of said plastic insert tending to apply pressure thereto in an outwardly radial direction.

2. The guide recited in claim 1 including a fluid passage in said tool extending from a source of supply through the shank of the tool to the insert to supply the pressure to the insert.

3. The guide recited in claim 1 including a fluid passage in said tool extending from a source of supply through the shank of the tool to the insert, the insert having an annular recess in communication with the source of fluid under pressure therein.

4. The guide recited in claim 2 including an outlet for leading the fluid under pressure to the area of the cutter head and there being a return passage for the fluid in said shank.

5. A tool of the class described comprising a shank, a cutter head at the end of the shank, the cutter head including cutting edges, a plastic insert mounted on said shank inwardly of the cutter, the plastic insert being slightly compressible and having a diameter slightly smaller before pressure is applied than the diameter of the cutter to act as a tool guide and vibration dampener, means providing for internal pressure tending to cause said plastic insert to expand both against the bushing for the cutter and the side wall of the hole which is being cut.

6. The tool of claim 5 wherein the means includes fluid pressure and including a passage forming an outlet for the fluid from inside the plastic insert to the cutter head.

7. The tool of claim 5 wherein the means includes fluid pressure and including a passage forming an outlet for the fluid from inside the plastic insert to the cutter head and a return passage in the shank therefor.

References Cited by the Examiner
UNITED STATES PATENTS
2,283,497   5/1942   Fields et al. _____ 77—55

FRANCIS S. HUSAR, *Primary Examiner.*